United States Patent
Zhong et al.

(10) Patent No.: US 11,767,884 B2
(45) Date of Patent: Sep. 26, 2023

(54) INSULATING CAP FOR BEARING ASSEMBLY

(71) Applicant: Schaeffler Technologies AG & Co. KG, Herzogenaurach (DE)

(72) Inventors: Guihui Zhong, Charlotte, NC (US); Venkata Kottapalli, Fort Mill, SC (US); Michael Heaton, Rock Hill, SC (US); John Tate, Cornelius, NC (US); Charles Schwab, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 72 days.

(21) Appl. No.: 17/501,441

(22) Filed: Oct. 14, 2021

(65) Prior Publication Data

US 2023/0122158 A1 Apr. 20, 2023

(51) Int. Cl.
*F16C 35/077* (2006.01)
*F16C 33/58* (2006.01)
*F16C 35/04* (2006.01)

(52) U.S. Cl.
CPC .......... *F16C 35/077* (2013.01); *F16C 33/586* (2013.01); *F16C 35/042* (2013.01)

(58) Field of Classification Search
CPC ..... F16C 33/586; F16C 35/042; F16C 35/077
See application file for complete search history.

(56) References Cited

U.S. PATENT DOCUMENTS

| | | | |
|---|---|---|---|
| 5,375,933 A * | 12/1994 | Mizutani | F16C 33/62 384/492 |
| 5,961,222 A * | 10/1999 | Yabe | F16C 33/586 384/477 |
| 8,764,301 B2 | 7/2014 | Winkelmann et al. | |
| 9,653,193 B2 | 5/2017 | Windrich et al. | |
| 2016/0238074 A1 | 8/2016 | Preis et al. | |
| 2021/0164518 A1* | 6/2021 | Feliciano | F16C 33/586 |

FOREIGN PATENT DOCUMENTS

| | | | |
|---|---|---|---|
| JP | 2007-2946 | * | 1/2007 |
| WO | WO2019156050 | * | 8/2019 |

OTHER PUBLICATIONS

Translation of JP2007-2946 obtained Feb. 21, 2023.*
Translation of WO2019/156050 obtained Feb. 21, 2023.*

* cited by examiner

*Primary Examiner* — James Pilkington
(74) *Attorney, Agent, or Firm* — Volpe Koenig (57) ABSTRACT

A bearing assembly is disclosed herein. The bearing assembly includes an outer bearing ring including at least one first connection element. The assembly also includes a cap defining an axial portion and at least one radial portion defining a cavity configured to receive the outer bearing ring. The cap includes at least one second connection element configured to mate with the at least one first connection element. The cap is formed from an electrically insulating material to prevent EDM.

17 Claims, 12 Drawing Sheets

INSULATING CAP FOR BEARING ASSEMBLY

FIELD OF INVENTION

The present disclosure is directed to a bearing assembly and is more particularly related to an insulating cap for a bearing assembly.

BACKGROUND

In automotive applications including axles, such as hybrid engines with e-axles, electrical current can be generated in running modes that leads to electrical arcing, pitting, and/or other types of damage to bearings. There is a growing need to provide an electrically insulating solution for bearings assemblies that prevents electrical current from passing therethrough. This type of insulation is desirable to protect bearing raceways and rolling elements from electrical discharge machining (EDM). Electrical insulation protection components are particularly important in a wet automatic transmission fluid (ATF) lubricated environment.

Known electrical insulating arrangements for bearings may include coatings or over-molded insulating layers. However, the process associated with forming these coatings and insulating layers can be labor intensive and expensive.

Accordingly, it would be desirable to provide an electrically insulating solution for a bearing assembly that is economical and simple to install.

SUMMARY

A bearing assembly is disclosed herein. The bearing assembly includes an outer bearing ring having at least one first connection element, and a cap having at least one second connection element configured to mate with the at least one first connection element. The cap is formed from an electrically insulating material to prevent EDM and otherwise avoid negative effects by electrical current passing through the bearing assembly. In one aspect, the cap is formed from plastic.

The first and second connection elements can each comprise mating spiral screws, in one aspect. In another aspect, the first connection element comprises an axial groove or rib, and the second connection element comprises a mating axial groove or rib.

The outer bearing ring can further comprise an additional first connection element, and the cap can further comprise an additional second connection element. The additional first connection element can be formed as a post or a receptacle on an axial end face of the outer bearing ring, and the additional second connection element can be formed as a mating post or receptacle on an axial end face of the cap.

The assembly can further comprise a face cover arranged on a first axial end of the outer bearing ring and the cap. The cap can contact an entire radially outer surface of the outer bearing ring and a second axial end of the outer bearing ring opposite from the face cover. The face cover can include a first face cover connection element and a second face cover connection element. The first face cover connection element is configured to engage with the cap and the second face cover connection element is configured to engage with the outer bearing ring. In one aspect, the first face cover connection element includes a first one of a tab or a groove, and the cap includes a second one of a tab or a groove configured to engage with the first face cover connection element. The second face cover connection element can include a first one of a protrusion or a receptacle, and the outer bearing ring can include a second one of a protrusion or a receptacle configured to engage with the second face cover connection element.

The cap and the outer bearing ring can be configured to be attached to each other via application of at least one of rotational force or axial force to at least one of the cap or the outer bearing ring.

In one aspect, the cap is formed from: high heat polyamide, glass fiber reinforced polyphenylene sulphide, polyetheretherketone (PEEK), or a composite resin of phenol and aldehyde.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

A bearing assembly 10 is generally disclosed herein that includes a cap 30. In one aspect, the cap 30 is an insulating cap that is configured to attach to at least one element of the bearing assembly 10. The cap 30 is preferably configured to attach to an outer bearing ring 20. The bearing assembly 10 can include a plurality of rolling elements 12 and a cage 14 configured to support and space the rolling elements 12.

Connection elements are generally provided between at least one of the cap, the outer bearing ring, and/or a face cover of the assembly. The term connection element is used herein to refer to any type of structure, profile, or element that is configured to be joined or attached to another element, i.e. another connection element. In one aspect, the term connection element refers to threading or screw-like profiles or grooves formed on one or more components. The term connection element is also used herein to refer to clips, snap-in features, or other interfaces between elements. For example, the term connection element can refer to a structure configured to undergo brief elastic deformation to clip or otherwise attach to another element. The term connection element is also used herein to refer to a protrusion or post and a mating pocket or receptacle that is dimensioned to receive the protrusion or post. This engagement can provide an interference fit, in one aspect, to ensure a tight connection between two components.

In an alternative configuration, one of ordinary skill in the art would understand that the cap could be attached or connected to other elements, such as the bearing cage, an inner bearing ring, a shaft, or a housing.

Referring to FIGS. 1A-1F, the cap 30 can include an axial portion 32 and at least one radial portion 34 defining a cavity 36 configured to receive the outer bearing ring 20.

The outer bearing ring 20 includes a first connection element 22 and the cap 30 includes a second connection element 38 configured to mate with the first connection element 22. As shown in FIGS. 1A-1F, the first connection element 22 can be formed as at least one groove. In one aspect, the first connection element 22 is formed as a plurality of circumferentially extending spiral grooves. One of ordinary skill in the art would understand that any one or more of the grooves disclosed herein can consist of one continuous groove or a plurality of grooves. The first connection element 22 can generally be formed as at least one groove, recess, pocket, receptacle, or other element configured to matingly engage with another component. The second connection element 38 can be formed as a groove configured to mate with the groove of the first connection element 22. The second connection element 38 can be formed as a plurality of circumferentially extending spiral grooves. The second connection element 38 can generally be formed as at least one groove, recess, pocket, receptacle, or other element configured to matingly engage with another component. In one aspect, the first and second connection elements 22, 38 are formed on respective radial surfaces of the outer bearing ring 20 and the cap 30.

The spiral grooves of the first connection element 22 and the second connection element 38 can extend for an entire axial extent of a respective one of the outer bearing ring 20 and the cap 30.

In one aspect, the first connection element is formed as a pocket and the second connection element is formed as a protrusion or projection configured to be received in the pocket. Alternatively, the second connection element is formed as a pocket and the first connection element is formed as a protrusion or projection configured to be received in the pocket. In one aspect, the first and second connection elements are formed on respective axial surfaces of the outer bearing ring 20 and the cap 30.

Figure 1A:
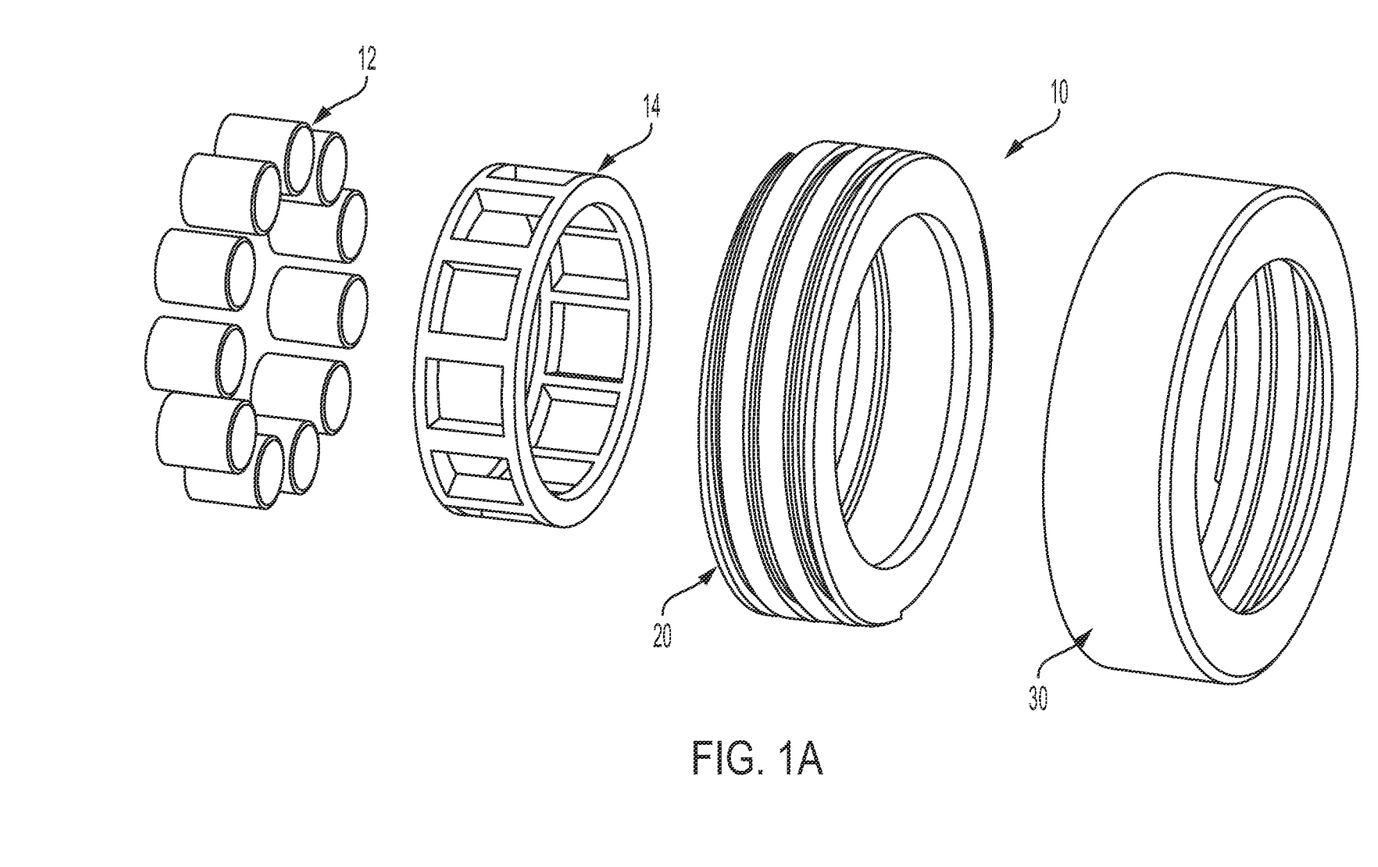
FIG. 1A is an exploded perspective view of a bearing assembly according to one aspect.
Figure 1B:
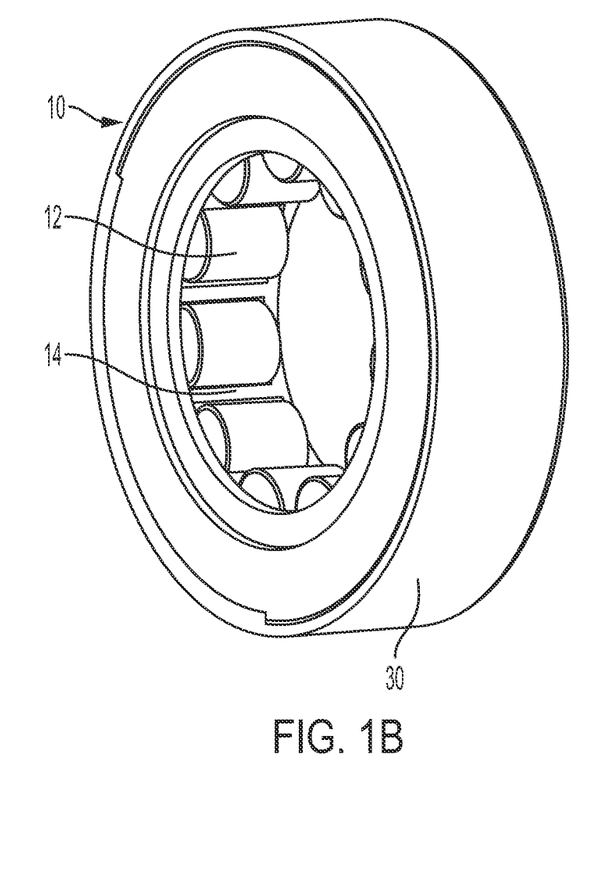
FIG. 1B is a perspective view of the bearing assembly of FIG. 1A.
Figure 1C:
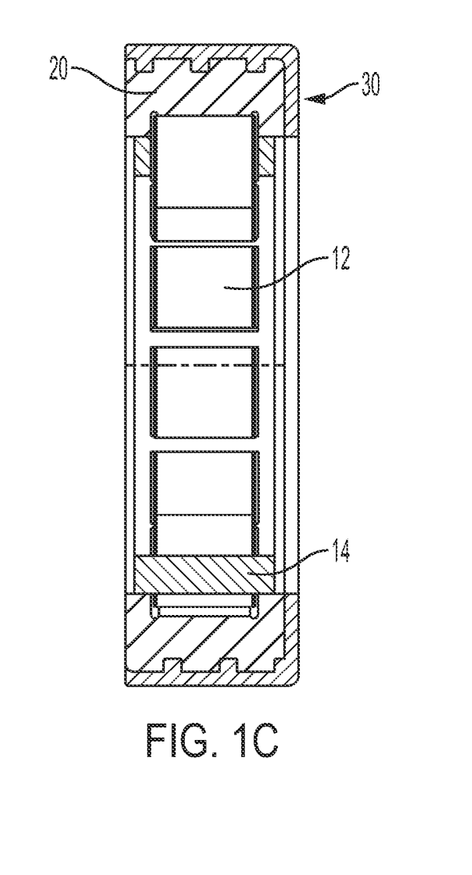
FIG. 1C is a cross-sectional view of the bearing assembly of FIGS. 1A and 1B.
Figure 1D:
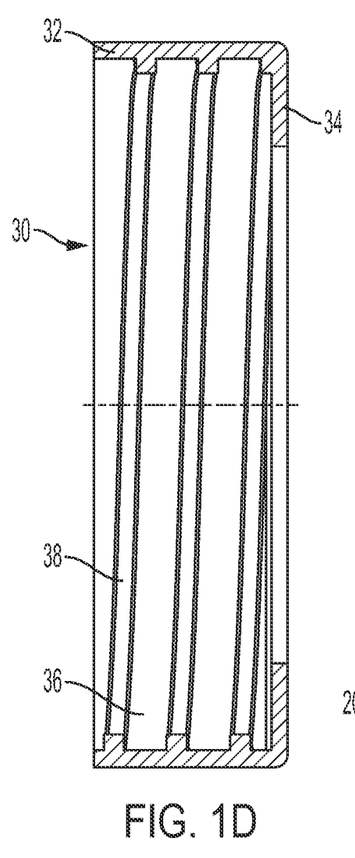
FIG. 1D is a cross-sectional view of a cap of the bearing assembly of FIGS. 1A-1C.
Figure 1E:
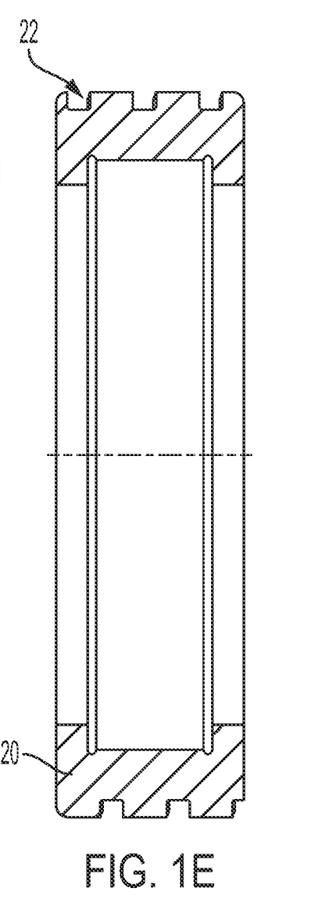
FIG. 1E is a cross-sectional view of an outer bearing of the bearing assembly of FIGS. 1A-1D.
Figure 1F:
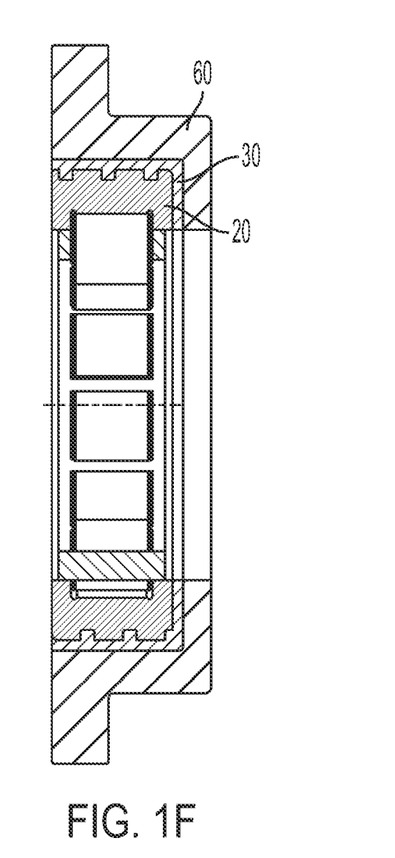
FIG. 1F is a cross-sectional view of the bearing assembly of FIGS. 1A-1E installed with a housing.
Figure 2A:
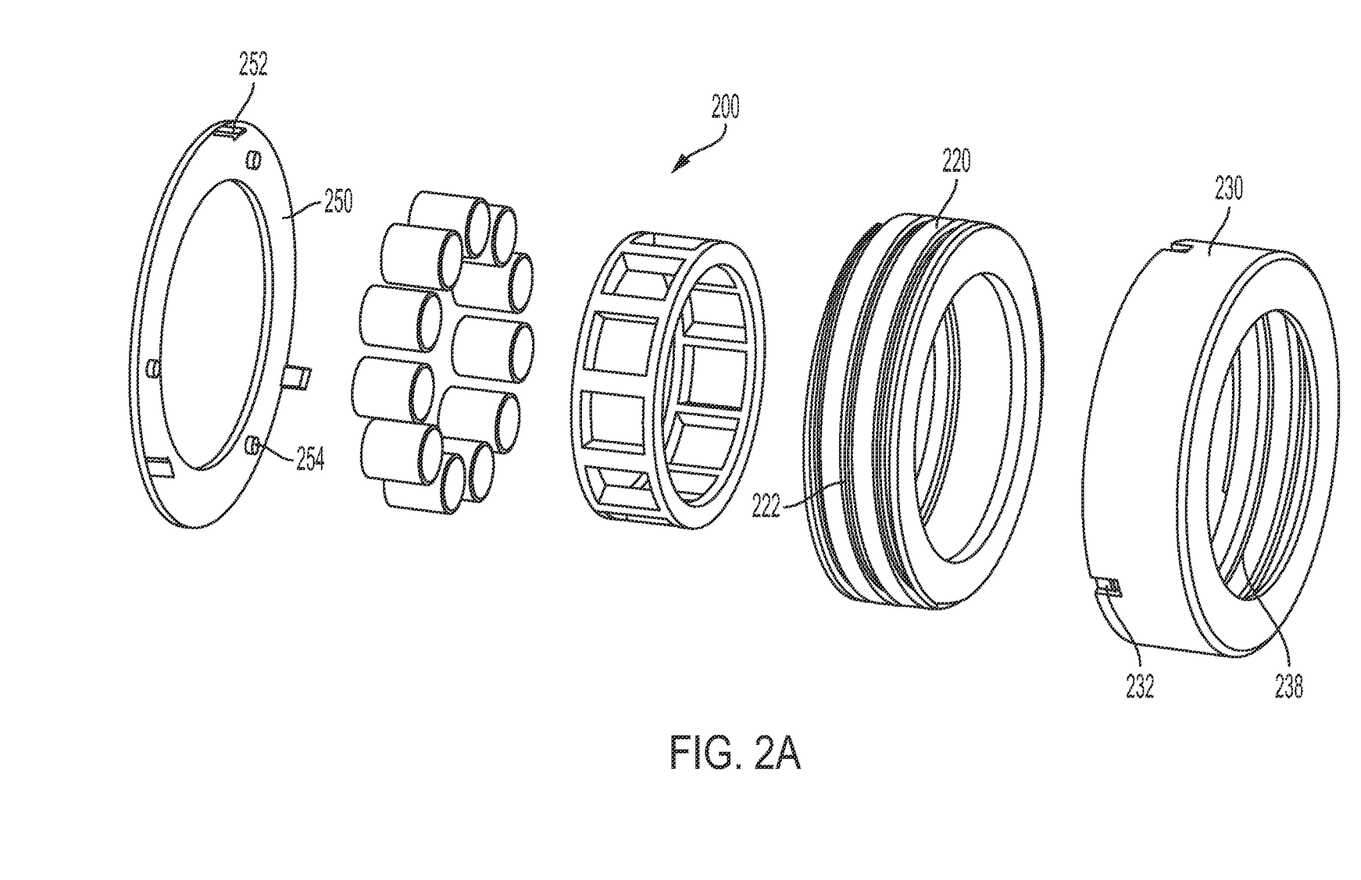
FIG. 2A is an exploded perspective view of a bearing assembly according to another aspect.
Figure 2B:
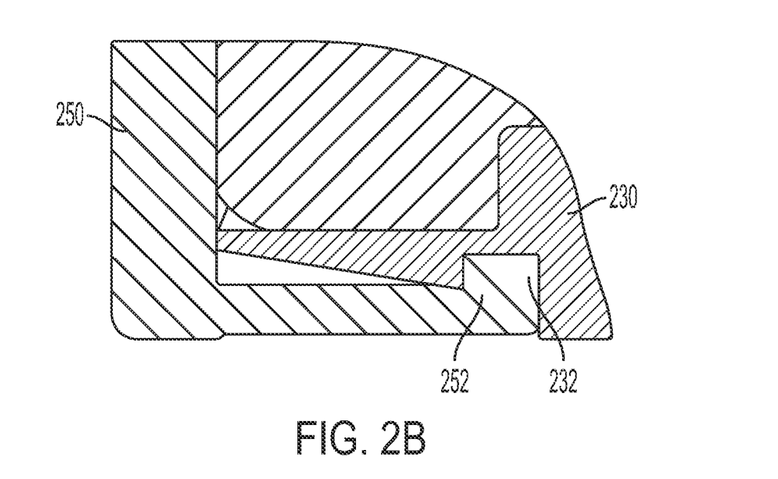
FIG. 2B is a magnified view of an interface between a face cover and a cap of the bearing assembly of FIG. 2A.
Figure 2C:
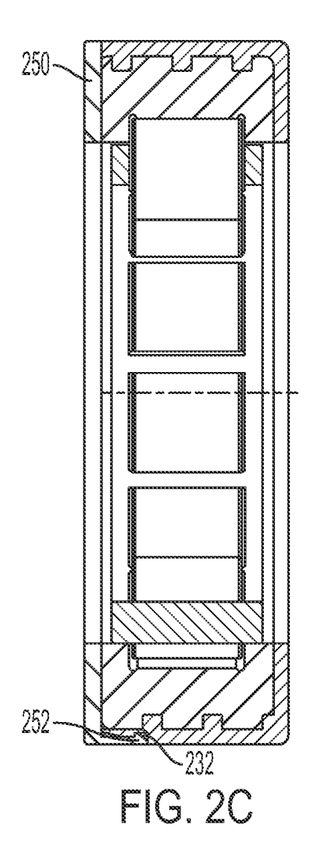
FIG. 2C is a cross-sectional view along a first cross-section of the bearing assembly of FIGS. 2A and 2B.
Figure 2D:
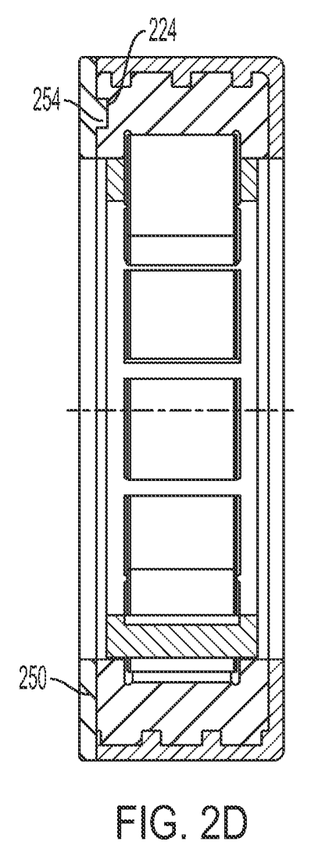
FIG. 2D is a cross-sectional view along a second cross-section of the bearing assembly of FIGS. 2A-2C.
Figure 3A:
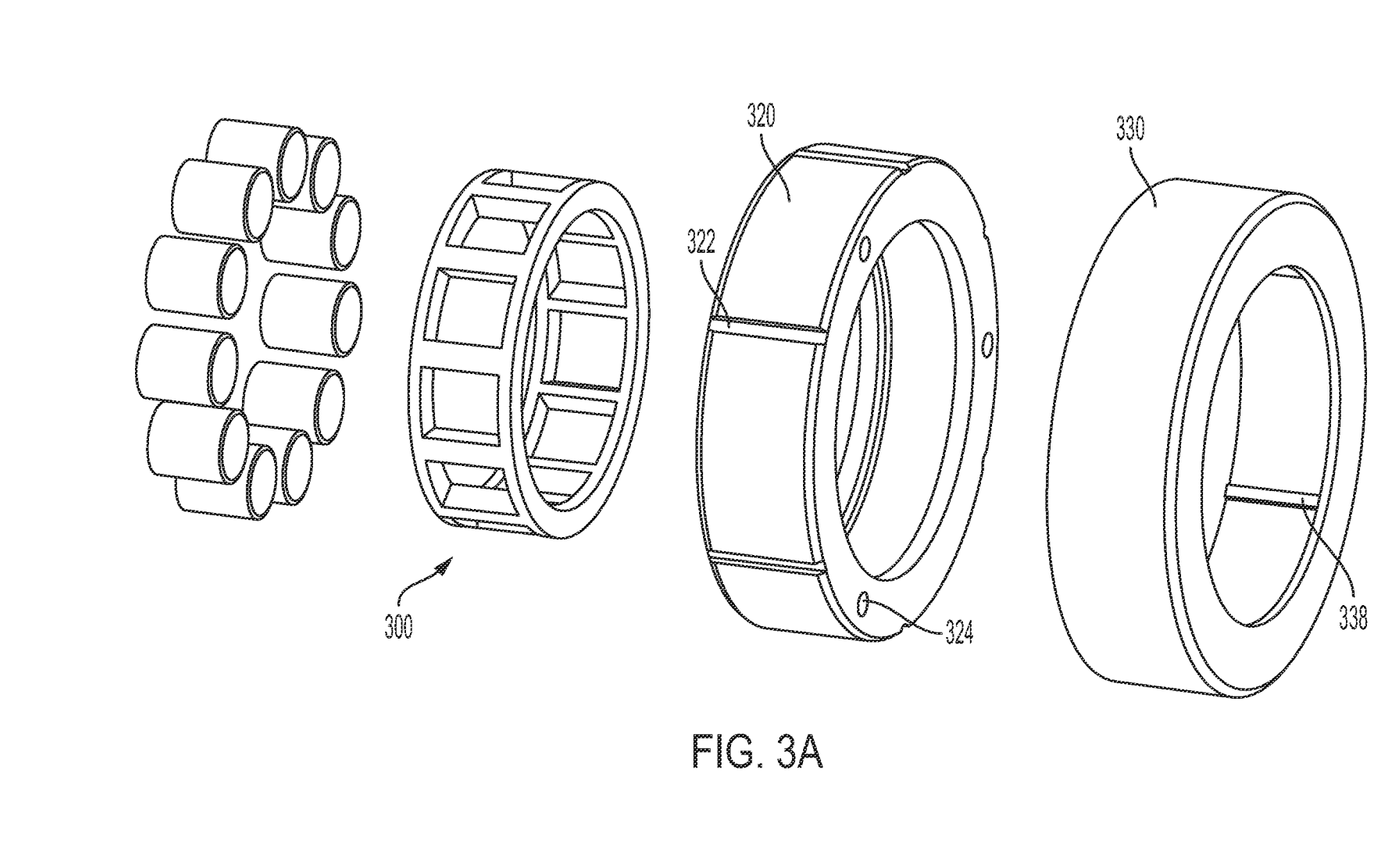
FIG. 3A is an exploded perspective view of a bearing assembly according to another aspect.
Figure 3B:
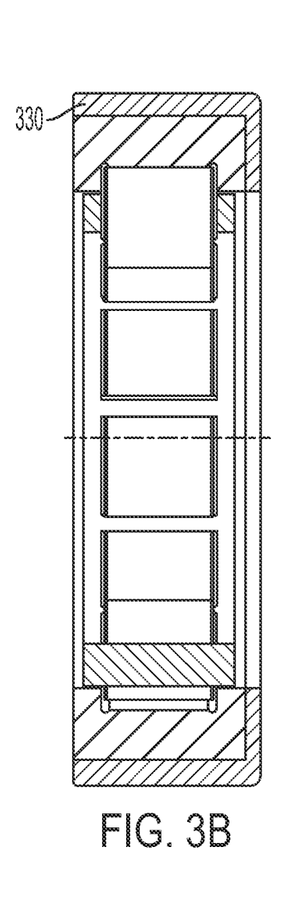
FIG. 3B is a cross-sectional view along a first cross-section of the bearing assembly of FIG. 3A.
Figure 3C:
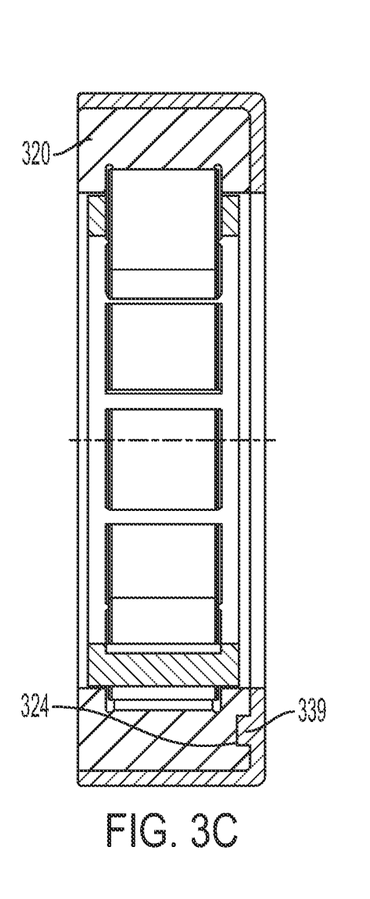
FIG. 3C is a cross-sectional view along a second cross-section of the bearing assembly of FIG. 3A.
Figure 3D:
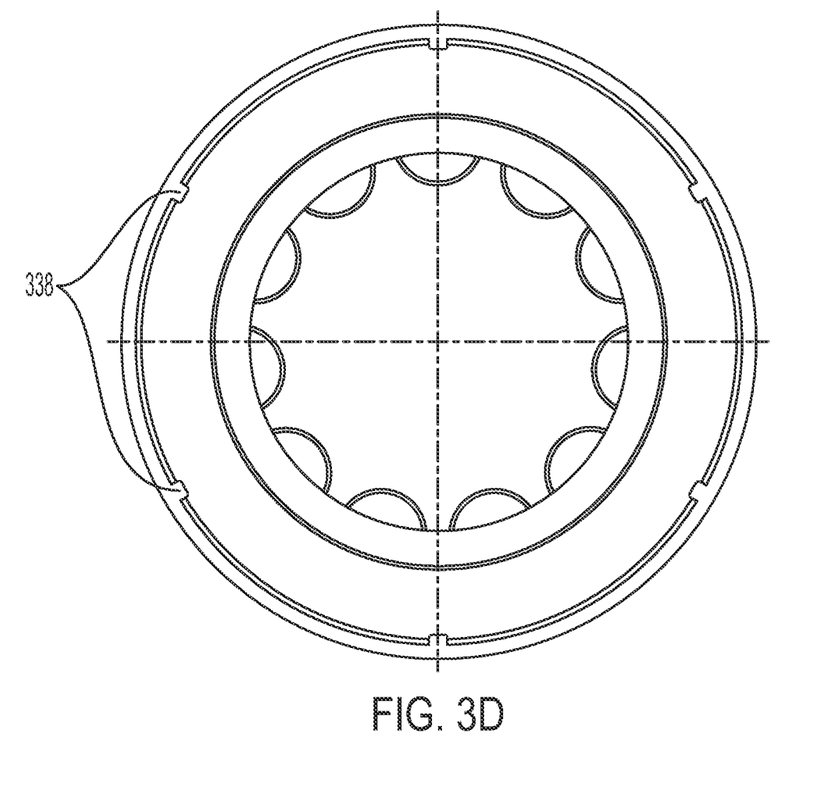
FIG. 3D is a rear view of the bearing assembly of FIGS. 3A-3C.
Figure 4A:
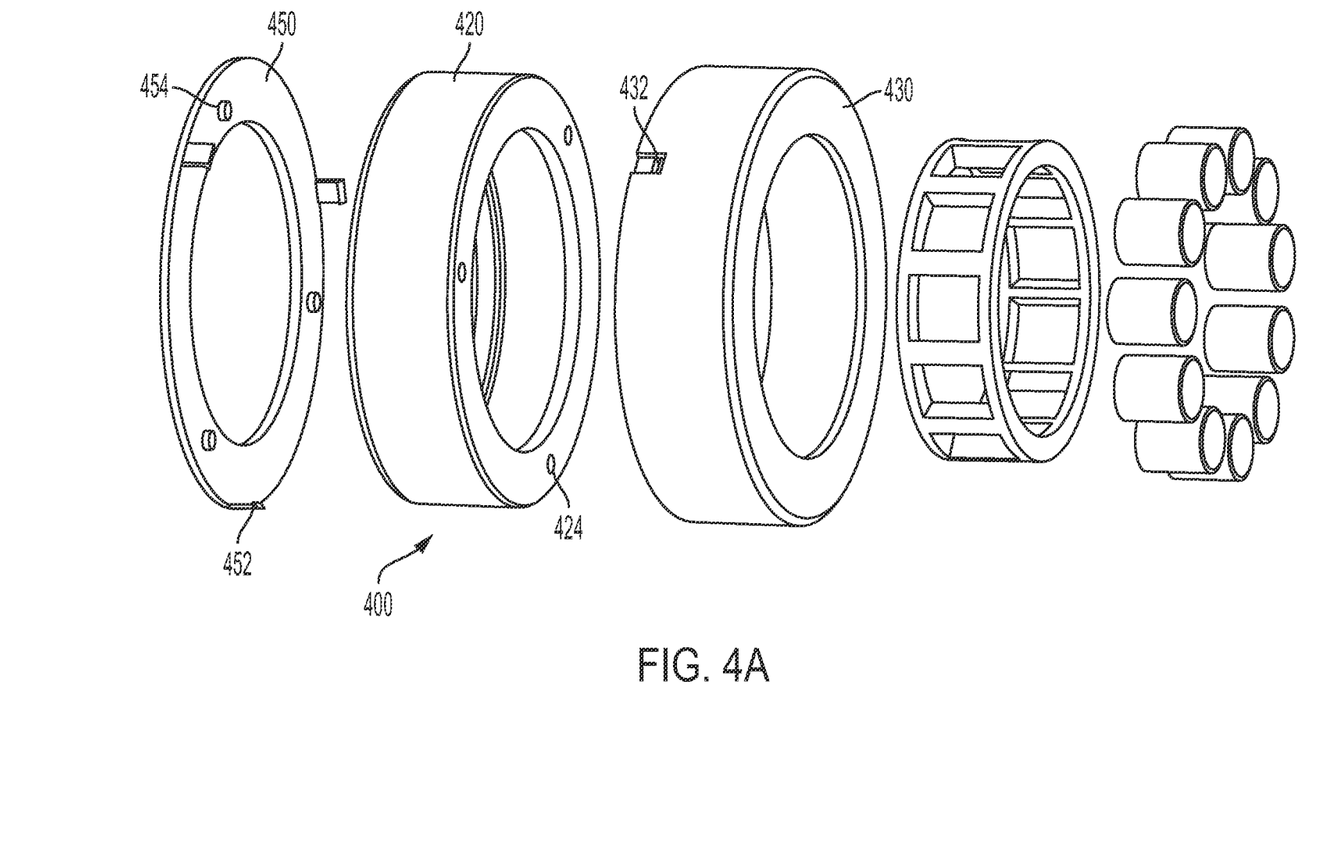
FIG. 4A is an exploded perspective view of a bearing assembly according to another aspect.
Figure 4B:
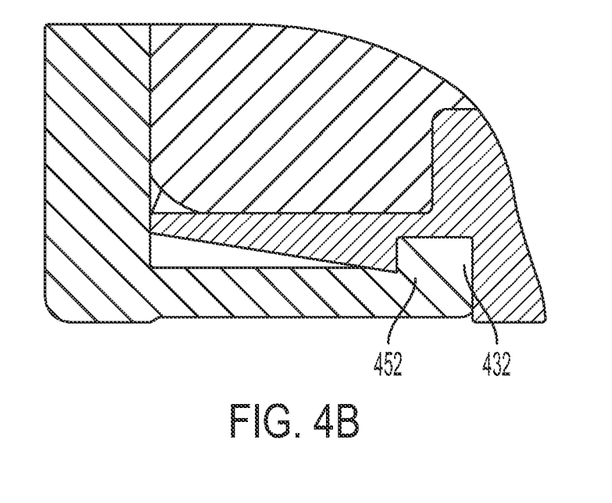
FIG. 4B is a magnified view of an interface between a face cover and a cap of the bearing assembly of FIG. 4A.
Figure 4C:
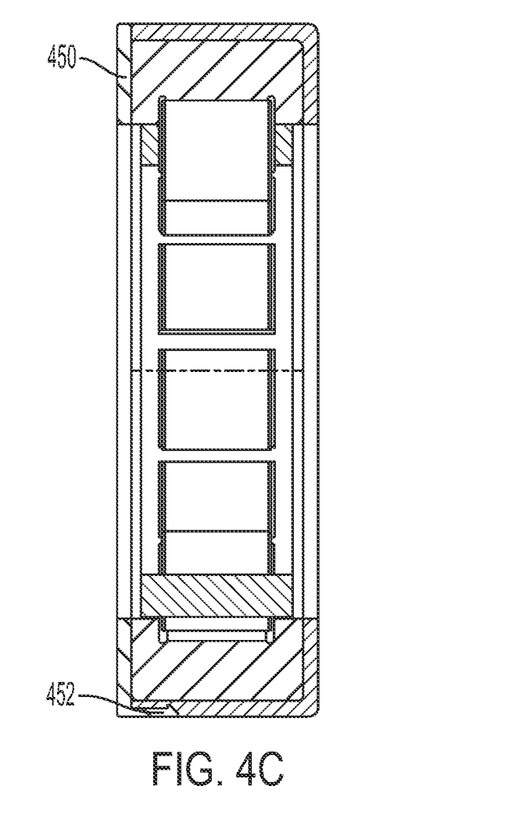
FIG. 4C is a cross-sectional view along a first cross-section of the bearing assembly of FIGS. 4A and 4B.
Figure 4D:
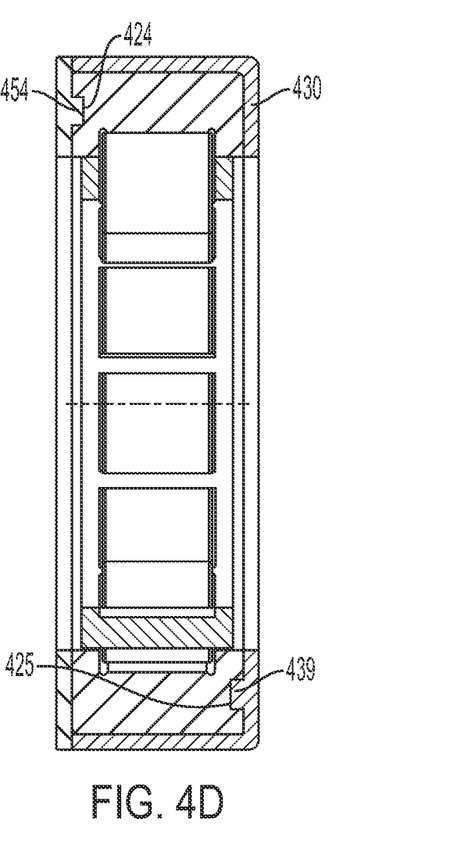
FIG. 4D is a cross-sectional view along a second cross-section of the bearing assembly of FIGS. 4A-4C.

In an installed state shown in FIG. 1F, a housing 60 is included and the cap 30 provides an insulated barrier between the outer bearing ring 20 and the housing 60. Based on this arrangement, the cap 30 acts as a protective element against EDM.

In one aspect, the cap 30 is formed from an electrically insulating material. The cap 30 can be formed from plastic. The cap 30 can be formed from high heat polyamide, such as PA46-GF30; glass fiber reinforced polyphenylene sulphide, such as PPS-GF40; polyetheretherketone (PEEK), such as PEEK-GF30; a composite resin of phenol and aldehyde, such as phenolic plastic; or a composite material, such as G-10/FR-4 glass epoxy.

FIGS. 2A-2D illustrate another aspect of a bearing assembly 200 that includes an outer bearing ring 220, a cap 230, and a cover (e.g., face cover) 250. As shown in FIGS. 2A-2D, the outer bearing ring 220 and the cap 230 both include connection elements on respective interfacing radial sides or surfaces. In one aspect, the connection elements are formed as spiral circumferential grooves 222, 238 that are configured to mate with each other.

The cover 250 can include two distinct types of connection elements, in one aspect. The cap 230 can further include at least one additional connection element 232 configured to mate with at least one first connection element 252 formed on the cover 250. The outer bearing ring 220 can further include at least one additional connection element 224 configured to mate with at least one second connection element 254 formed on the cover 250.

In one aspect, the additional connection element 232 formed on the cap 230 includes a plurality of grooves or pockets, and the first connection element 252 formed on the cover 250 includes a plurality of tabs or flanges. In one aspect, the additional connection element 232 is a snap-in groove and the first connection element 252 is a snap-in tab. One of ordinary skill in the art would understand that the cap 230 could include a groove and the cover 250 could include a tab. The additional connection element 232 can be formed at an edge between an axial surface and a radial surface of the cap 230.

The additional connection element 224 formed on the outer bearing ring 220 can include a plurality of pockets or receptacles, and the second connection element 254 formed on the cover 250 can include a plurality of posts or studs dimensioned to be received within the plurality of pockets or receptacles of the outer bearing ring 220. In one aspect, this connection is provided as an interference fit. The additional connection element 224 can be formed on an axial end face of the outer bearing ring 220. Likewise, the second connection element 254 on the cover 250 is also formed on an axial end face of the cover 250. One of ordinary skill in the art would understand that the location of these connection elements can vary. In one aspect, the posts or studs 254 can be used to prevent rotation and reduce the risk of breaking the tab 252.

FIGS. 3A-3D illustrate another bearing assembly 300. As shown in FIGS. 3A-3D, the outer bearing ring 320 can include at least one axial groove 322 configured to engage with at least one axial rib 338 formed on the cap 330. In one aspect, the at least one axial groove 322 includes a plurality of grooves and the at least one axial rib 338 includes a plurality of ribs. One of ordinary skill in the art would understand that alternatively, the cap 330 can include grooves and the outer bearing ring 320 can include ribs. In one aspect, the grooves 322 and ribs 338 extend in a completely axial direction. The grooves 322 and the ribs 338 are also considered connection elements, in one aspect.

As shown in FIGS. 3A-3D, the outer bearing ring 320 can further include at least one additional connection element 324, and the cap 330 can further include at least one additional connection element 339. In one aspect, the connection elements 324, 339 are defined on respective axial end surfaces of the outer bearing ring 320 and the cap 330.

In one aspect, the connection element 324 on the outer bearing ring 320 is a receptacle or pocket, and the connection element 339 on the cap 330 is a post or stud. The outer bearing ring 320 can include a plurality of receptacles or pockets 324, and the cap 330 includes a plurality of posts or studs 339 dimensioned to be received within the receptacles or pockets 324 of the outer bearing ring 320. One of ordinary skill in the art would understand that alternatively, the outer bearing ring 320 could include posts or studs, and the cap 330 could include receptacles or pockets.

FIGS. 4A-4D illustrate another aspect of a bearing assembly 400. As shown in these Figures, the cap 430 includes at least one first connection element 432 configured to engage with at least one first connection element 452 formed on the cover 450. At least one second connection element 454 on the cover 450 is configured to engage with at least one first connection element 424 formed on the outer bearing ring 420. In one aspect, the first connection element 432 on the cap 430 includes a plurality of grooves or pockets, and the first connection element 452 formed on the cover 450 includes a plurality of tabs or flanges. The first connection element 424 formed on the outer bearing ring 420 can include a plurality of pockets or receptacles and the second connection element 454 formed on the cover 450 can include a plurality of posts or studs dimensioned to be received within the plurality of pockets or receptacles of the outer bearing ring 420. As shown in more detail in FIG. 4D, the cap 430 can include a second connection element 439 configured to engage with a second connection element 425 formed on the outer bearing ring 420. The second connection element 439 formed on the cap 430 can be formed as a plurality of posts or studs and the second connection element 425 formed on the outer bearing ring 420 can be formed as a pocket or receptacle dimensioned to receive the posts or studs.

In one aspect, connections between the caps and the outer bearing rings are achieved via a pre-formed mechanically-based fastening or attachment arrangement. None of the arrangements require separate bonding materials or heat application, such as heat shrinking techniques, to secure the caps to the bearing rings. The caps disclosed herein are fully formed or pre-formed prior to engagement with the outer rings. Each of the caps disclosed herein can be attached to other components in the bearing assembly using minimal manual effort, such as screwing one component relative to another, snapping in one part relative to another, or circumferentially aligning connection elements and pressing the components together. Other simple manual techniques can be used to attach or connect the cap relative to other components of the bearing assembly. In one aspect, the cap and the outer bearing ring are configured to be attached or connected to each other via application of at least one of rotational force (i.e. for the configurations including screws of FIGS. 1A-2D) or axial force (i.e. for the snap-in configuration of FIGS. 3A-4D).

In one aspect, the cap surrounds an entire radially outer surface of the outer bearing ring, and also contacts an entire axial end face of the outer bearing ring. In one aspect, the cap only contacts one axial end face of the outer bearing ring. In another aspect, the cap can contact both axial end faces of the outer bearing ring.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS bearing assembly 10
rolling elements 12
cage 14
outer bearing ring 20
first connection element 22
cap 30
axial portion 32
radial portion 34
cavity 36
second connection element 38
housing 60
bearing assembly 200
outer bearing ring 220
spiral circumferential grooves 222
additional connection element 224 on the outer bearing ring
cap 230
additional connection element 232 on the cap
spiral circumferential grooves 238
cover 250
first connection element 252 on the cover
second connection element 254 on the cover
bearing assembly 300
outer bearing ring 320
axial groove 322
connection element 324 on the outer bearing ring
cap 330
axial rib 338
connection element 339 on the cap
bearing assembly 400
outer bearing ring 420
first connection element 424 on the outer bearing ring
second connection element 425 on the outer bearing ring
cap 430
first connection element 432 on the cap
second connection element 439 on the cap
cover 450
first connection element 452 on the cover
second connection element 454 on the cover

What is claimed is:

1. A bearing assembly comprising:
   an outer bearing ring including at least one first connection element; and
   a cap including an axial portion and at least one radial portion defining a cavity configured to receive the outer bearing ring, the cap including at least one second connection element configured to mate with the at least one first connection element, wherein the cap is formed from an electrically insulating material;
   wherein the at least one first connection element comprises one of an axially extending groove or an axially extending rib, and the at least one second connection element comprises the other of an axially extending groove or an axially extending rib;
   wherein the outer bearing ring further comprises at least one additional first connection element, and the cap further comprises at least one additional second connection element; and
   wherein the at least one additional first connection element is formed as one of a post or a receptacle on an axial end face of the outer bearing ring, and the at least one additional second connection element is formed as the other one of a post or a receptacle on an axial end face of the cap.

2. The bearing assembly according to claim 1, wherein the cap is formed from plastic.

3. The bearing assembly according to claim 1, wherein the at least one first and second connection elements comprise mating spiral screws.

4. The bearing assembly according to claim 1, further comprising a face cover arranged on a first axial end of the outer bearing ring and the cap.

5. The bearing assembly according to claim 4, wherein the cap contacts an entire radially outer surface of the outer bearing ring and a second axial end of the outer bearing ring opposite from the face cover.

6. The bearing assembly according to claim 1, wherein the cap and the outer bearing ring are configured to be attached to each other via application of at least one of rotational force or axial force to at least one of the cap or the outer bearing ring.

7. The bearing assembly according to claim 1, wherein the cap surrounds an entire radially outer surface of the outer bearing ring.

8. The bearing assembly according to claim 1, wherein the cap contacts an entire axial end face of the outer bearing ring.

9. The bearing assembly according to claim 1, wherein the cap is formed from: polyamide, glass fiber reinforced polyphenylene sulphide, polyetheretherketone (PEEK), or a composite resin of phenol and aldehyde.

10. A bearing assembly comprising:
    an outer bearing ring including at least one first connection element; and
    a cap including an axial portion and at least one radial portion defining a cavity configured to receive the outer bearing ring, the cap including at least one second connection element configured to mate with the at least one first connection element, wherein the cap is formed from an electrically insulating material;
    a face cover arranged on a first axial end of the outer bearing ring and the cap; and wherein the face cover includes at least one first face cover connection element and at least one second face cover connection element, wherein the at least one first face cover connection element is configured to engage with the cap and the at least one second face cover connection element is configured to engage with the outer bearing ring.

11. The bearing assembly according to claim 10, wherein the at least one first face cover connection element includes one of a tab or a groove, and the cap includes the other of a tab or a groove configured to engage with the at least one first face cover connection element.

12. The bearing assembly according to claim 10, wherein the at least one second face cover connection element includes one of a protrusion or a receptacle, and
    the outer bearing ring includes the other of a protrusion or a receptacle configured to engage with the at least one second face cover connection element.

13. A bearing assembly comprising:
    an outer bearing ring including at least one first connection element; and
    an electrically insulating cap defining a cavity configured to receive the outer bearing ring, the cap including at least one second connection element configured to mate with the at least one first connection element, wherein the cap and the outer bearing ring are configured to be connected to each other via application of at least one of rotational force or axial force to at least one of the cap or the outer bearing ring; and
    a face cover arranged on a first axial end of the outer bearing ring and the cap;
    wherein the face cover includes at least one first face cover connection element and at least one second face cover connection element, wherein the at least one first face cover connection element is configured to engage with the cap and the at least one second face cover connection element is configured to engage with the outer bearing ring.

14. The bearing assembly according to claim 13, wherein the at least one first and second connection elements comprise mating spiral screws, and the cap and the outer bearing ring are connected to each other via application of rotational force to either the cap or the outer bearing ring.

15. The bearing assembly according to claim 13, wherein the at least one first connection element comprises a first one of an axially extending groove or an axially extending rib, and the at least one second connection element comprises a second one of an axially extending groove or an axially extending rib, wherein the cap and the outer bearing ring are connected to each other via application of axial force to either the cap or the outer bearing ring.

16. The bearing assembly according to claim 13, wherein the cap surrounds an entire radially outer surface of the outer bearing ring, and the cap contacts an entire axial end face of the outer bearing ring.

17. The bearing assembly according to claim 13, wherein the at least one first face cover connection element includes one of a tab or a groove, and the cap includes the other of a tab or a groove configured to engage with the at least one first face cover connection element, and
    wherein the at least one second face cover connection element includes one of a protrusion or a receptacle, and the outer bearing ring includes the other one of a protrusion or a receptacle configured to engage with the at least one second face cover connection element.

* * * * *